US012410722B2

(12) United States Patent
Phillips et al.

(10) Patent No.: US 12,410,722 B2
(45) Date of Patent: Sep. 9, 2025

(54) CIRCUMFERENTIAL ROW OF VANES FOR A GAS TURBINE ENGINE AND HAVING NON-UNIFORM VANE SPACING

(71) Applicant: General Electric Company, Schenectady, NY (US)

(72) Inventors: Julia Elizabeth Phillips, Cincinnati, OH (US); Brandon Chapman, West Chester, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 178 days.

(21) Appl. No.: 18/335,591

(22) Filed: Jun. 15, 2023

(65) Prior Publication Data

US 2024/0418095 A1 Dec. 19, 2024

(51) Int. Cl.
*F01D 9/04* (2006.01)

(52) U.S. Cl.
CPC .......... *F01D 9/041* (2013.01); *F05D 2220/32* (2013.01); *F05D 2250/37* (2013.01)

(58) Field of Classification Search
CPC .................................................. F05D 2250/37
See application file for complete search history.

(56) References Cited

U.S. PATENT DOCUMENTS

| | | | | |
|---|---|---|---|---|
| 3,006,603 | A | 10/1961 | Caruso et al. | |
| 6,402,458 | B1 | 6/2002 | Turner | |
| 7,931,442 | B1 | 4/2011 | Liang | |
| 8,678,752 | B2 * | 3/2014 | Delvaux | F01D 5/16 415/119 |
| 10,443,626 | B2 | 10/2019 | Mielke et al. | |
| 10,690,055 | B2 | 6/2020 | Stover et al. | |
| 10,774,750 | B2 * | 9/2020 | Walker | F01D 25/24 |

FOREIGN PATENT DOCUMENTS

| | | | | |
|---|---|---|---|---|
| EP | 0921274 | A2 | 6/1999 | |
| EP | 2912278 | B1 | 12/2018 | |
| GB | 1058759 | A | 2/1967 | |
| GB | 2250782 | B | 4/1994 | |
| GB | 2471151 | A * | 12/2010 | F01D 25/04 |

* cited by examiner

*Primary Examiner* — Courtney D Heinle
*Assistant Examiner* — Danielle M. Christensen
(74) *Attorney, Agent, or Firm* — McCarter & English, LLP

(57) ABSTRACT

A circumferential row of vanes for a gas turbine engine, the circumferential row of vanes has non-uniform spacing. The circumferential row of vanes includes a plurality of stator vanes arranged circumferentially about an inner ring. The plurality of stator vanes include a first group of stator vanes having a first spacing between adjacent stator vanes of the first group of stator vanes and a second group of stator vanes having a second spacing between adjacent stator vanes of the second group of stator vanes. The second spacing is from two percent to eleven percent greater than a nominal uniform vane spacing or from two percent to eleven percent lesser than the nominal uniform vane spacing, the nominal uniform vane spacing being defined by a total number of the plurality of stator vanes. An engine includes the circumferential row of vanes.

20 Claims, 5 Drawing Sheets

CIRCUMFERENTIAL ROW OF VANES FOR A GAS TURBINE ENGINE AND HAVING NON-UNIFORM VANE SPACING

TECHNICAL FIELD

The present disclosure relates generally to a circumferential row of vanes for a gas turbine, the circumferential row of vanes having non-uniform vane spacing.

BACKGROUND

A turbine engine generally includes a fan and a core section arranged in flow communication with one another. The core section includes one or more turbines and one or more compressors. The turbines and compressors include one or more stages, with each stage including rotor vanes and stator vanes.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
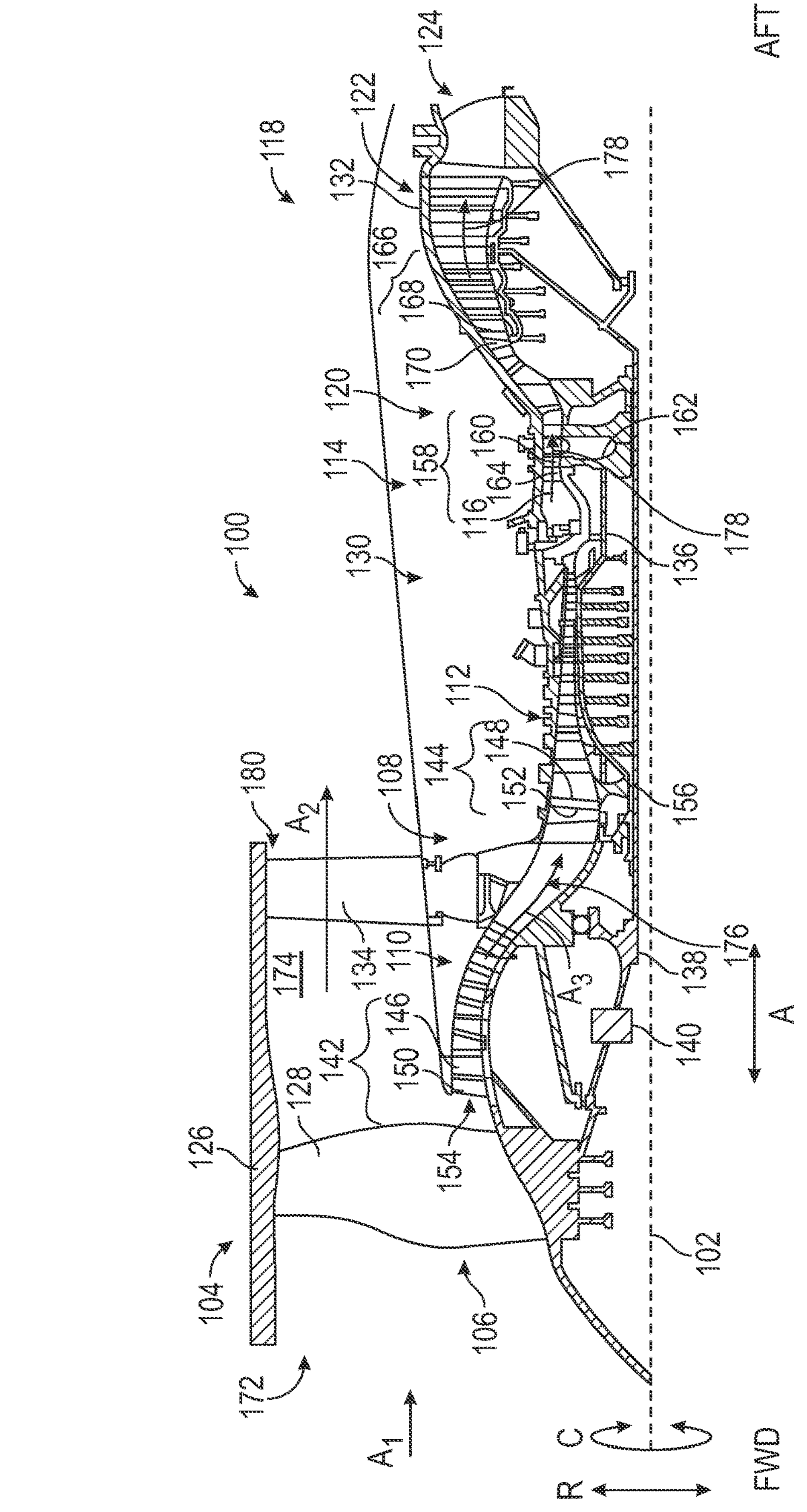
FIG. 1 illustrates a schematic, cross-sectional view of a ducted, indirect-drive gas turbine engine, taken along a longitudinal centerline axis of the engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Turbine engines include rotor blades and stator vanes in turbines and compressors. The stator vanes are formed of airfoils, referred to herein as stator airfoils, that create a wake or disturbance in the airflow downstream and upstream of the airfoil. The wake or disturbance acts as a pulse on the airfoils that form the rotor blades, referred to herein as rotor airfoils. The pulse acting on the rotor airfoil can excite the rotor airfoil into a vibratory response frequency or vibratory response state. The frequency or rate of the pulse depends on a variety of factors, including a combination of engine speeds, also referred to as engine revolutions per minute (RPM), the number of stator airfoils, and the spacing of the stator airfoils. The severity of the vibratory response depends on a variety of factors, including, but not limited to engine RPM and the frequency of the pulse.

Non-uniform vane spacing is provided in a circumferential row of the stator airfoils to reduce the severity of the vibratory response. Non-uniform vane spacing provides multiple vane spacings within the same circumferential row of the stator airfoils. Using non-uniform vane spacing can change the pulsing frequency from a singular frequency into a range of pulsing frequencies, which, in turn, can change the RPMs at which the rotor airfoils are excited, thus, lowering the severity of the vibratory response. Depending on the non-uniform vane spacing provided, the pulsing frequency can be raised or lowered. Lowering the pulsing frequency increases the RPM of the excitation of the rotor airfoils, while raising the pulsing frequency decreases the RPM of the excitation of the rotor airfoils. Therefore, non-uniform vane spacing provides a decrease in the severity of the vibratory response, but does so at the cost of spreading the vibratory response over a wider range of pulsing frequencies, which equates to spreading the vibratory response over a wider range of engine speeds. Accordingly, the non-uniform vane spacing of the present disclosure achieves the aforementioned benefits, but addresses the spreading of the vibratory response over a wider range of pulsing frequencies by providing a non-uniform vane spacing that forces the majority of the driving harmonics to occur on just a single side of the uniform driving frequency (either higher or lower than the uniform driving frequency). More specifically, the non-uniform vane spacing of the present disclosure allows for the pulsing frequency to be targeted to a particular predetermined harmonic or to avoid a particular predetermined harmonic.

The circumferential row of vanes having non-uniform vane spacing of the present disclosure breaks up the aforementioned vibratory response across a range of multiple harmonics. The circumferential row of vanes having non-uniform vane spacing of the present disclosure biases the harmonic response with respect to the driving harmonic (N) of a uniformly spaced circumferential row of vanes. That is, the circumferential row of vanes having non-uniform spacing of the present disclosure targets the high side harmonics (e.g., above N) or the low side harmonics (e.g., below N). This results in a harmonic response that is primarily on one side of the main driving harmonic N and may result in a harmonic response that is N+1 or N−1 or more. The targeting of the high side or the low side harmonics allows for a higher shift or a lower shift of the harmonic resonant speeds. Targeting the harmonic responses on only one side of the main driving harmonic may allow for the previously discussed pulsing frequency to occur at a predetermined speed. The speed may either be outside of the operating range of the engine or may be lowered such that the speed of the pulsing frequency is of no concern to engine operation, even if still within the operating range of the engine.

Accordingly, the circumferential row of vanes having non-uniform spacing of the present disclosure provides a non-uniform vane spacing that is divided between a first group of vanes having a first spacing and a second group of vanes having a second spacing. The spacing in the first group is unequal to the spacing in the second group. The second group is from twenty percent to forty percent of the total number of vanes on the circumferential row and the second group spacing is from two percent to eleven percent greater or lesser than a nominal uniform vane spacing.

FIG. 1 shows a schematic, cross-sectional view of a ducted, indirect-drive, gas turbine engine 100, also referred to as turbine engine 100, taken along a longitudinal centerline axis 102 of the turbine engine 100, according to an embodiment of the present disclosure. The turbine engine 100, also referred to herein as a turbine engine 100, includes, in downstream serial flow relationship, a fan section 104 including a fan 106, a compressor section 108 including a booster or a low-pressure (LP) compressor 110 and a high-pressure (HP) compressor 112, a combustion section 114 including a combustor 116, a turbine section 118 including a high-pressure (HP) turbine 120, a low-pressure (LP) turbine 122, and an exhaust nozzle 124. As shown in FIG. 1, the turbine engine 100 defines an axial direction A, a radial direction R, and a circumferential direction C.

The fan section 104 includes a fan casing 126, which is secured to a nacelle (omitted for clarity) surrounding the fan 106. The fan 106 includes a plurality of fan blades 128 disposed radially about the longitudinal centerline axis 102. The HP compressor 112, the combustor 116, and the HP turbine 120 form an engine core 130 of the turbine engine 100, which generates combustion gases. The engine core 130 is surrounded by a core casing 132, which is coupled to the fan casing 126. The fan casing 126 is supported relative to the turbomachine by circumferentially spaced outlet guide vanes 134.

A high-speed shaft 136, also referred to herein as a high-pressure shaft 136, is disposed coaxially about the longitudinal centerline axis 102 of the turbine engine 100 and drivingly connects the HP turbine 120 to the HP compressor 112. A low-speed shaft 138, also referred to herein as a low-pressure shaft 138, which is disposed coaxially about the longitudinal centerline axis 102 of the turbine engine 100 and within the larger diameter, annular, high-speed shaft 136, drivingly connects the LP turbine 122 to the LP compressor 110 and the fan 106 (either directly or indirectly through a gearbox assembly 140). The high-speed shaft 136 and the low-speed shaft 138 are rotatable about the longitudinal centerline axis 102.

The LP compressor 110 and the HP compressor 112, respectively, include a respective plurality of compressor stages 142, 144, in which a respective set of compressor blades 146, 148 rotate relative to a respective set of compressor vanes 150, 152 to compress or to pressurize gas entering through an inlet 154. Each compressor stage 144 of the HP compressor 112 includes multiple compressor blades 148 provided on a rotor disk 156 (or the blades and the disk are integrated together, referred to as a blisk), also referred to herein as rotor compressor blades 148. Each compressor blade 148 extends radially outwardly relative to the longitudinal centerline axis 102, from a blade platform to a blade tip. Compressor vanes 152, also referred to herein as stator vanes 152, are positioned upstream/downstream of and adjacent to rotor compressor blades 148. The rotor disk 156 for a stage of compressor blades 148 is mounted to the high-speed shaft 136. The compressor stage 144 of the HP compressor 112 may refer to a single disk of rotor compressor blades 148 or may refer to both the single disk of rotor compressor blades 148 and an adjacent single disk of stator vanes 152. Either meaning can apply within the context of this disclosure without loss of clarity. The same description applies to each compressor stage 142 of the LP compressor 110 (e.g., each compressor stage 142 of the LP compressor 110 includes multiple rotor compressor blades 146 and stator compressor vanes 150).

The HP turbine 120 has one or two turbine stages 158. In a single turbine stage 158, turbine blades 160 are provided on a rotor disk 162, as referred to herein as rotor blades 160. Each turbine blade 160 extends radially outwardly relative to the longitudinal centerline axis 102, from a blade platform to a blade tip. The HP turbine 120 can also include stator turbine vanes 164, also referred to as stator turbine nozzles. The HP turbine 120 may have an upstream nozzle adjacent an exit of the combustor 116 and a downstream nozzle aft of the rotor (e.g., turbine blades 160) or the HP turbine 120 may have a nozzle upstream of the rotor blades (e.g., turbine blades 160) or downstream of the rotor blades.

Air exiting the HP turbine 120 enters the LP turbine 122, which has a plurality of turbine stages 166 of the rotor blades 168. The LP turbine 122 can have three, four, five, or six stages. In a single LP turbine stage 166 (containing a plurality of blades 168 coupled to the low-speed shaft 138), the blades 168, also referred to herein as rotor blades 168, are provided on a rotor disk (connected to the low-speed shaft 138) and extend radially outwardly relative to the longitudinal centerline axis 102, from a blade platform to a blade tip. The LP turbine 122 can also include stator turbine vanes 170, also referred to as a stator turbine nozzles. The LP turbine 122 may have both an upstream nozzle and a downstream nozzle aft of a turbine stage 166, followed by the exhaust nozzle 124.

During operation of the turbine engine 100, a volume of air $A_1$ enters the turbine engine 100 through an inlet 172 of the fan casing 126. As the volume of air $A_1$ passes through the fan section 104 and across the fan blades 128, a first portion of air $A_2$ of the air $A_1$ is directed or routed into a bypass air flow passage 174 and a second portion of air $A_3$ of the air $A_1$ is directed or routed into the inlet 154 at an upstream section of a core air flow passage 176. The ratio between the first portion of air $A_2$ and the second portion of air $A_3$ is commonly known as a bypass ratio. The pressure of the second portion of air $A_3$ is then increased as it is routed through the HP compressor 112 and into the combustion section 114, where the highly pressurized air is mixed with fuel and burned to provide combustion gases 178.

The combustion gases 178 are routed into the HP turbine 120 and expanded through the HP turbine 120 where a portion of thermal and/or kinetic energy from the combustion gases 178 is extracted via sequential stages of the HP turbine 120 turbine vanes 164 and rotor blades 160, which are coupled to the high-speed shaft 136, thus causing the high-speed shaft 136 to rotate, thereby supporting operation of the HP compressor 112. The combustion gases 178 are then routed into the LP turbine 122 and expanded through the LP turbine 122. Here, a second portion of thermal and kinetic energy is extracted from the combustion gases 178 via sequential stages of the LP turbine 122 turbine vanes 170 and the LP turbine rotor blades 168 that are coupled to the low-speed shaft 138, thus, causing the low-speed shaft 138 to rotate. The rotation of the low-speed shaft 138 thereby supports operation of the LP compressor 110 and rotation of the fan 106 (via the gearbox assembly 140, when present).

The combustion gases 178 are subsequently routed through the exhaust nozzle 124 to provide propulsive thrust. Simultaneously, the pressure of the first portion of air $A_2$ is substantially increased as the first portion of air $A_2$ is routed through the bypass air flow passage 174 before being exhausted from a fan nozzle exhaust 180, also providing propulsive thrust.

The turbine engine 100 is by way of example only. In other embodiments, the gas turbine engine may have any other suitable configuration, including, for example, any other suitable number or configurations of shafts or spools, fan blades, turbines, compressors, or a combination thereof. The gearbox assembly may have any suitable configuration, including, for example, a star gear configuration, a planet gear configuration, a single-stage, a multi-stage, epicyclic, non-epicyclic, etc., as detailed further below. The gearbox may have a gear ratio in a range of 3:1 to 4:1, 3:5 to 4:1, 3.25:1 to 3.5:1, or 4:1 to 5:1. The fan assembly may be any suitable fixed-pitched assembly or variable-pitched assembly. The turbine engine 100 may include additional components not shown in FIG. 1, such as rotor blades, stator vanes, etc. The fan assembly may be configured in any other suitable manner (e.g., as a fixed pitch fan) and further may be supported using any other suitable fan frame configuration. Aspects of the present disclosure may be incorporated into any other suitable turbine engine, including, but not limited to, turbofan engines, propfan engines, turbojet engines, turboprop, and turboshaft engines, aviation-based turbine engines, marine-based turbine engines, land-based turbine engines, industrial turbine engines, power generation turbine engines, etc.

As noted, the high-pressure and the low-pressure compressors and turbines include one or more stages each having stator vanes and rotor blades. Each of the stator vanes and rotor blades include airfoils. The airfoils, whether stator or rotor, are arranged in a circumferential manner about the longitudinal centerline axis 102 (FIG. 1). That is, each stage of the compressor and turbine is associated with a ring or circumferential row of stator airfoils and a ring or a circumferential row of rotor airfoils. The rotor airfoils or stator airfoils are axisymmetric about the longitudinal centerline axis 102.

Figure 2A:
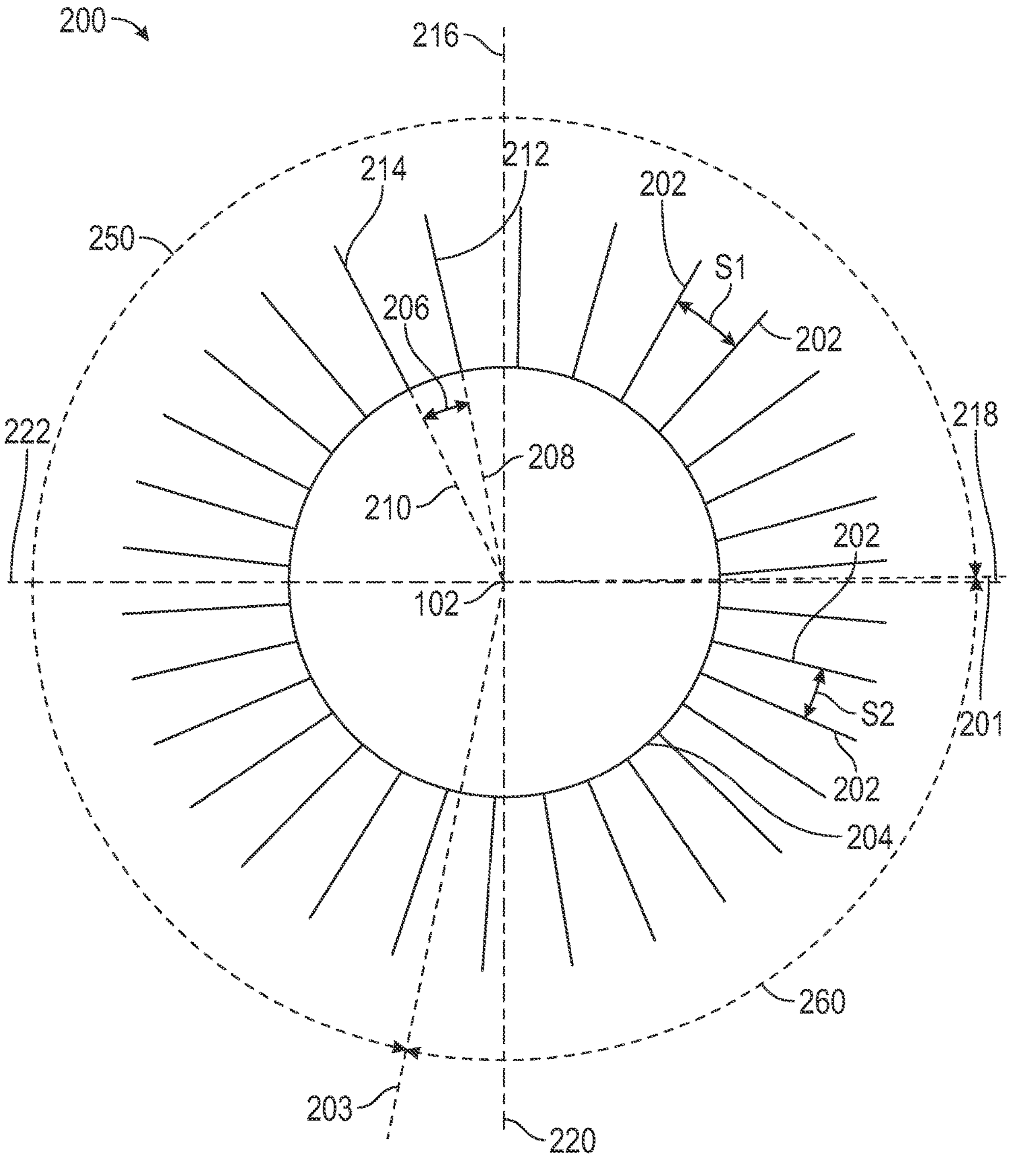
FIG. 2A illustrates a schematic, end view of a circumferential row of stator vanes that may be used in the turbine engine of FIG. 1, according to the present disclosure.

FIG. 2A illustrates a schematic end view, from forward to aft, of an exemplary circumferential row 200 of stator vanes 202. The circumferential row 200 of stator vanes 202 has a non-uniform vane spacing (NUVS). As shown in FIG. 2A, the stator vanes 202 are axisymmetric about the longitudinal centerline axis 102 of the turbine engine 100 (FIG. 1). Each of the stator vanes 202 extends radially outward from an inner ring 204 that extends circumferentially around the longitudinal centerline axis 102.

The circumferential row 200 may be used as any of the stator vanes of the turbine engine 100 described with respect to FIG. 1. For example, the compressor vanes 150 of the LP compressor 110, the compressor vanes 152 of the HP compressor 112, the turbine vanes 164 of the HP turbine 120, or the turbine vanes 170 of the LP turbine 122 may be formed of stator vanes 202 in a circumferential row 200. Any single stage, combination of stages, or all stages of any or all of the LP compressor, LP turbine, HP compressor, or HP turbine may be formed of the circumferential row 200 of stator vanes 202.

The circumferential row 200 described with respect to FIG. 2A has a non-uniform vane spacing defined by the spacing between at least two stator vanes 202 being different than the spacing between at least two other stator vanes 202. In the example of FIG. 2A, the circumferential row 200 is divided into two groups, a first group of stator vanes 250 and a second group of stator vanes 260. Each of the stator vanes 202 in the first group of stator vanes 250 and the second group of stator vanes 260 may be the same. In the first group of stator vanes 250, adjacent stator vanes 202 have a first spacing S1. Adjacent stator vanes 202 are defined as two stator vanes 202 that are directly circumferentially next to each other with no intervening stator vanes 202. In the second group of stator vanes 260, adjacent stator vanes 202 have a second spacing S2. The spacing S1 is unequal to the spacing S2 such that the spacing between adjacent stator vanes 202 in the first group of stator vanes 250 is unequal to the spacing between adjacent stator vanes 202 in the second group of stator vanes 260.

The first group of stator vanes 250 and the second group of stator vanes 260 each includes a discrete grouping of stator vanes 202. In each of the first group of stator vanes 250 and the second group of stator vanes 260, the group extends between a first axis 201 and a second axis 203. The groupings are provided such that only two distinct groups of spacings between stator vanes 202 are present, such as shown in FIG. 2A. That is, the second group of stator vanes 260 is not dispersed in multiple locations around the circumference of the circumferential row 200. In other words, the circumferential row 200 includes only one first group of stator vanes 250 and only one second group of stator vanes 260 and, thus, only two defined spacings S1 and S2. The first group of stator vanes 250 is adjacent the second group of stator vanes 260 such that a circumferentially distal stator vane on either end of the first group of stator vanes 250 is adjacent a respective circumferentially distal stator vane on either end of the second group of stator vanes 260. The spacing S2 is determined between the distal stator vanes of the second group of stator vanes 260 in the manner discussed in more detail to follow. The spacing S2 between the distal stator vanes of the second group of stator vanes 260 defines the spacing of the remaining stator vanes of the circumferential row 200.

The circumferential row 200 may be viewed with respect to a "clock" orientation having a twelve o'clock position 216, a three o'clock position 218, a six o'clock position 220, and a nine o'clock position 222. Although not provided with reference numerals, the clock orientation is understood to include all clock positions therebetween. In the orientation of FIG. 2A, the first group of stator vanes 250 extends in a clockwise direction from about the six o'clock position 220 to about the three o'clock position 218. The second group of stator vanes 260 extends in a clockwise direction from about the three o'clock position 218 to about the six o'clock position 220.

Figure 2B:
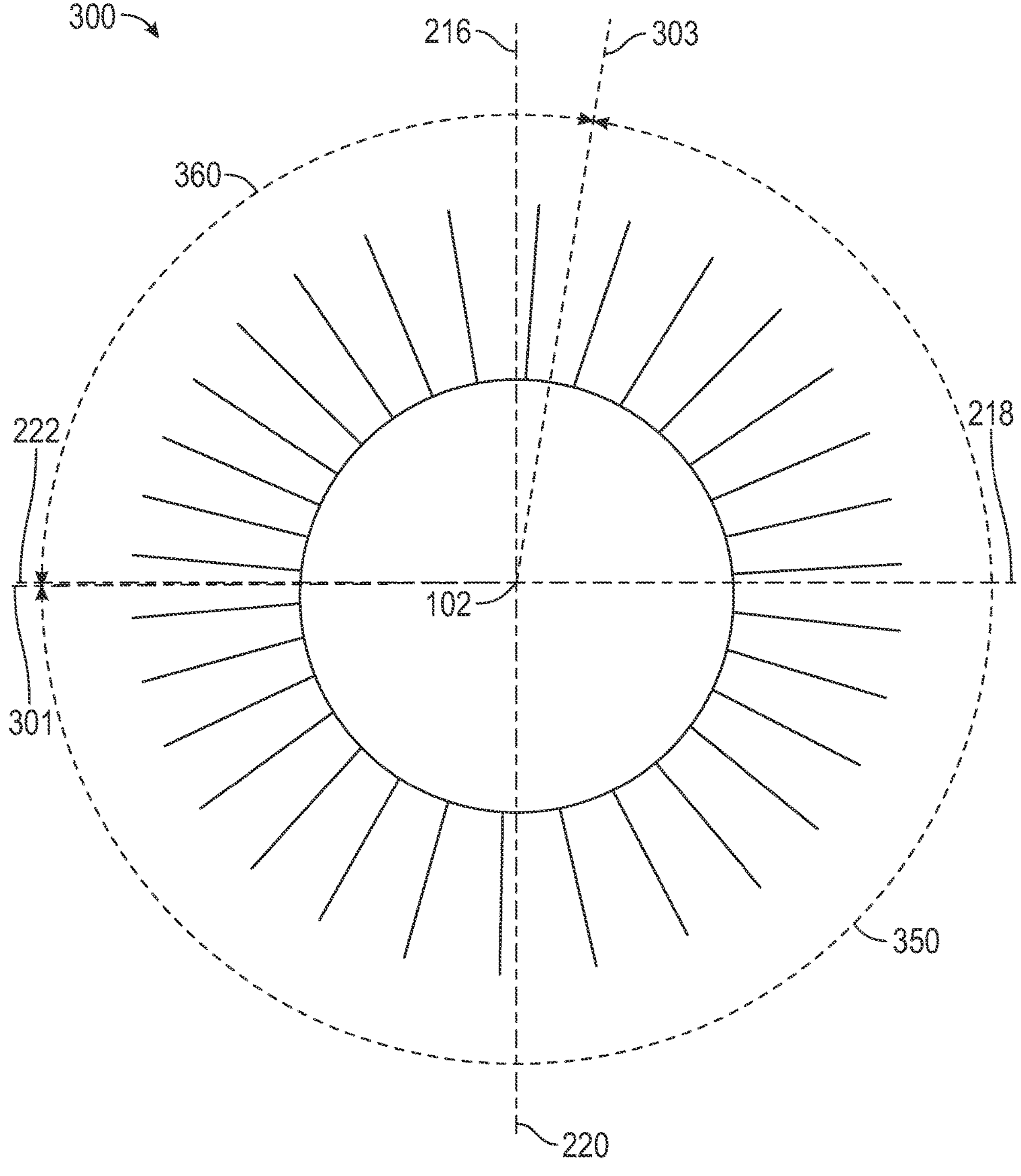
FIG. 2B illustrates a schematic, end view of an alternative orientation of the circumferential row of stator vanes of FIG. 2A, according to the present disclosure.

Although shown in the orientation of FIG. 2A, the stator vanes 202 may be rotated circumferentially to any clock position around the circumferential row 200. For example, FIG. 2B illustrates a circumferential row 300 of stator vanes that is rotated as compared to the circumferential row 200. All aspects of the circumferential row 300 are identical to the circumferential row 200 except for the "clocking" of the circumferential row 300. In each of the first group of stator vanes 350 (which is identical to the first group of stator vanes 250 except for the clock orientation) and the second group of stator vanes 360 (which is identical to the second group of stator vanes 260 except for the clock orientation), the group extends between a first axis 301 and a second axis 303. As shown in FIG. 2B, a first group of stator vanes 350 extends from about the twelve o'clock position 216 to about the nine o'clock position 222. The second group of stator vanes 360 extends from about the nine o'clock position 222 to the twelve o'clock position 216. The orientations of FIGS. 2A and 2B are merely exemplary and the first group of stator vanes 250, 350 and the second group of stator vanes 260, 360 may be rotated to any clock position so long as only two groupings of stator vanes are provided.

Referring back to FIG. 2A, the spacing S1 and the spacing S2 may be defined by an angular measurement. The angular measurement is defined by a spacing measured with respect to an angle created between adjacent stator vanes 202. For example, an angle 206 may be defined between an axis 208 of a first stator vane 212 extending through and perpendicular to the longitudinal centerline axis 102 and an axis 210 of a second, adjacent stator vane 214 extending through and perpendicular to the longitudinal centerline axis 102. The measured angle 206 defines the first spacing S1. Although the angular measurement is shown, by way of example only, in the first group of stator vanes 250 to define the first spacing S1, an angular measurement is also used to determine the second spacing S2. The angular measurement of the second spacing S2 may be measured between axis of adjacent stator vanes as described with respect to the first spacing S1.

In the example of FIG. 2A, the number of stator vanes 202 in the second group of stator vanes 260 is from twenty percent to forty percent of the total number of stator vanes 202 in the circumferential row 200. This is shown in relationship (1), below, where n is the total number of stator vanes 202 in the circumferential row 200 and $n_{260}$ is the number of stator vanes 202 in the second group of stator vanes 260.

$$0.2*n \le n_{260} \le 0.4*n \tag{1}$$

The number of stator vanes 202 in the second group of stator vanes 260 may be any percentage between, and including, twenty percent and forty percent. In some examples, the number of stator vanes 202 in the second group of stator vanes 260 is about one-third, or thirty-three percent, of the total number of stator vanes 202 in the circumferential row 200. In some examples, the number of stator vanes 202 in the second group of stator vanes 260 is about twenty-nine percent, such as the example of FIGS. 3A and 3B.

The percentages are approximate (e.g., referred to as "about" a particular percentage) since a discrete percentage of the total number of stator vanes 202 may result in a partial vane being included in a group, however, only full vanes are included in the first and second groups. For example, in the example with thirty one vanes (e.g., the example of FIGS. 3A and 3B), exactly twenty-nine percent of the total number of thirty-one vanes results in 8.99 vanes in the second group of stator vanes, however, as discussed herein, the second group of stator vanes includes nine vanes. Thus, the twenty-nine percent is approximate. Therefore, in the context of the present disclosure, the term "about" or "approximately" refers to a percentage rounded to ensure that each of the first group and the second group of stator vanes includes a whole vane, and not a partial vane.

The number of stator vanes 202 in the first group of stator vanes 250 is the remainder of the stator vanes of the total stator vanes after the percentage of stator vanes in the second group of stator vanes 260 is determined, as shown in relationship (2), where $n_{250}$ is the number of stator vanes 202 in the first group of stator vanes 250.

$$n_{250} = n - n_{260} \tag{2}$$

Accordingly, the number of stator vanes 202 in the first group of stator vanes 250 depends on the number of stator vanes 202 in the second group of stator vanes 260. Thus, when the number of stator vanes in the second group of stator vanes 260 is about one-third, the number of stator vanes in the first group of stator vanes is two-thirds. Each stator vane 202 is included in only one of the two groups, either the first group of stator vanes 250 or the second ground of stator vanes 260.

In the example of FIG. 2A, the second spacing S2 is from two percent to eleven percent lesser than a nominal uniform vane spacing S, as shown in relationship (3) below, or the second spacing S2 is from two percent to eleven percent greater than the nominal uniform vane spacing S, as shown in relationship (4) below.

$$S - 0.02*S \le S2 \le S - 0.11*S \tag{3}$$

$$S + 0.02*S \le S2 \le S + 0.11*S \tag{4}$$

In some examples, the second spacing S2 is from four percent to six percent lesser than a nominal uniform vane spacing S or the second spacing S2 is from four percent to six percent greater than the nominal uniform vane spacing S.

The nominal uniform vane spacing S is defined as the spacing between adjacent stator vanes having a uniform (e.g., equal) distribution around the entirety of the circumference of the circumferential row. That is, the nominal uniform vane spacing can be defined by the relationship (5) below, where n is the total number of stator vanes on the circumferential row:

$$S = \frac{360 \text{ degrees}}{n} \quad (5)$$

Once the second spacing S2 is determined based on the above description, the first spacing S1 is determined by taking the remaining number of vanes (e.g., the number of vanes $n_{250}$) and dividing that number about the remaining number of degrees of the circumferential row 200 (e.g., the remaining number of degrees from the whole three hundred sixty degrees).

The circumferential row 200 described with respect to FIG. 2A is illustrated with thirty-one vanes, however, any number of vanes may be provided in the circumferential row 200. The circumferential row 200 may be applied to any number of constructed vanes and the exact features of the airfoils forming the stator vanes 202, e.g., dimensions, angle, fixed or variable pitch are not limiting. As mentioned previously, the circumferential row 300 of FIG. 2B is identical to the circumferential row 200 of FIG. 2A, except for the clocked orientation of the first group of stator vanes 350 and the second group of stator vanes 360.

Figure 3A:
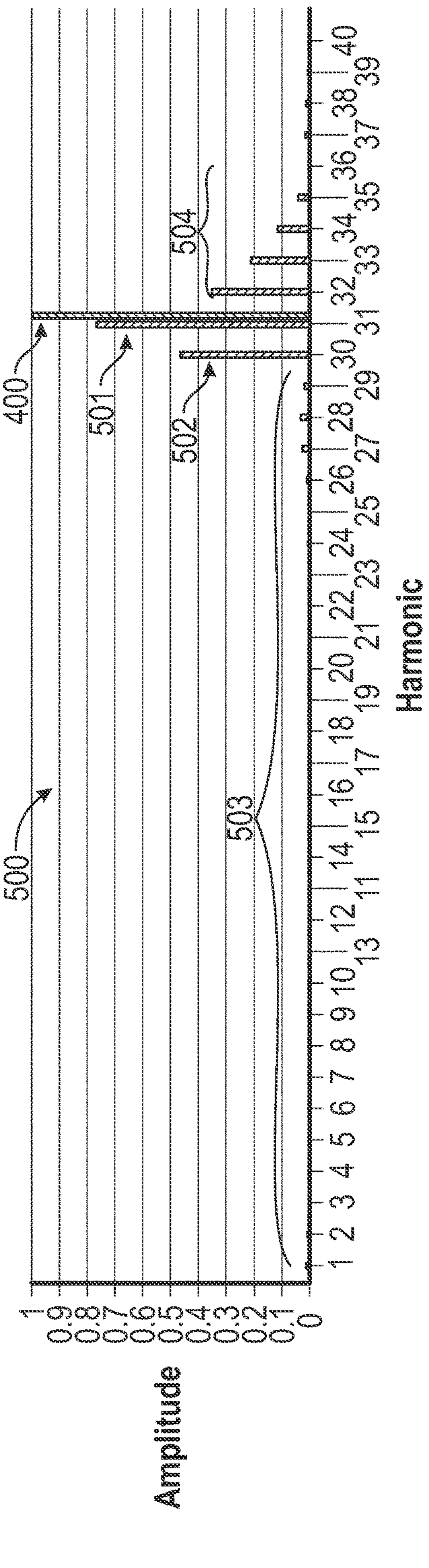
FIG. 3A illustrates a graph of harmonic biasing with the circumferential row of stator vanes of FIG. 2A or FIG. 2B, according to the present disclosure.
Figure 3B:
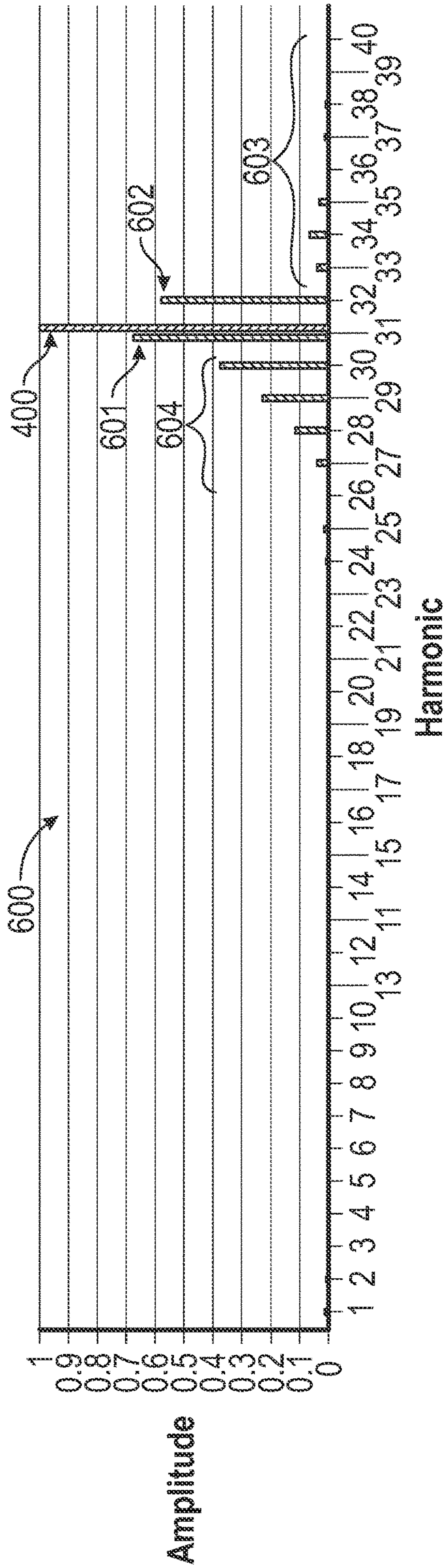
FIG. 3B illustrates a graph of harmonic biasing with the circumferential row of stator vanes of FIG. 2A or FIG. 2B, according to the present disclosure.

The effect of the non-uniform vane spacing of the circumferential row 200 is described with respect to FIGS. 3A and 3B. As mentioned previously, a non-uniform vane spacing in accordance with the present disclosure allows for harmonic biasing around the main driving harmonic. For example, FIGS. 3A and 3B illustrate an exemplary circumferential row including a vane count of thirty-one, as shown in FIGS. 2A and 2B. In the example of FIGS. 3A and 3B, the first group of stator vanes 250 (FIGS. 2A and 2B) includes twenty-two vanes and the second group of stator vanes 260 (FIGS. 2A and 2B) includes nine vanes. With uniform vane spacing of a circumferential row also having thirty-one vanes, there is a main driving harmonic 400, also referred to herein as the uniform main driving harmonic 400, occurring at the thirty-first harmonic and the vanes have a nominal uniform spacing. In examples with a different vane count, the main driving harmonic may be shifted to align with the vane count.

In FIG. 3A, the circumferential row has a non-uniform vane spacing, where the spacing of the second group of stator vanes (e.g., spacing S2 (FIGS. 2A and 2B)) is two percent to eleven percent lesser than the nominal uniform vane spacing (e.g., spacing S). In particular, the example of FIG. 3A includes a spacing S2 of the second group of stator vanes of 4.3 percent lesser than the nominal vane spacing. As noted, both the non-uniform vane spacing and the uniform vane spacing are defined for a circumferential row having thirty-one vanes. This results in harmonic biasing to higher harmonics. That is, as shown in FIG. 3A, a harmonic response 500 includes a main driving harmonic 501 occurring at the thirty-first harmonic and an N−1 harmonic 502 that is the harmonic one lower than the main driving harmonic 501. The harmonic response 500 has little to no response for harmonics 503 lower than the N−1 harmonic 502 and the harmonic response is biased to harmonics 504 higher than the main driving harmonic 501 (e.g., the N+1 and greater harmonics). By little to no response, it is meant that the harmonic response of the harmonics 503 is less than the harmonic response of at least one of the harmonics 504 in the biased group. In the example of FIG. 3A, the harmonic response of the harmonics 503 are all less than the harmonic response at the four harmonics greater than the main driving harmonic 501.

In FIG. 3B, the circumferential row has a non-uniform vane spacing, where the spacing of the second group of stator vanes (e.g., spacing S2 (FIGS. 2A and 2B)) is two percent to eleven percent greater than the nominal uniform vane spacing (e.g., spacing S). In particular, the example of FIG. 3B includes a spacing S2 of the second group of stator vanes of 5.2 percent greater than the nominal vane spacing. As noted, both the non-uniform vane spacing and the uniform vane spacing are defined for a circumferential row having thirty-one vanes. This results in harmonic biasing to lower harmonics. That is, as shown in FIG. 3B, a harmonic response 600 includes a main driving harmonic 601 occurring at the thirty-first harmonic and an N+1 harmonic 602 that is the harmonic one greater than the main driving harmonic 601. The harmonic response 600 has little to no response for harmonics 603 higher than the N+1 harmonic 602 and the harmonic response is biased to harmonics 604 lower than the main driving harmonic 601 (e.g., the N−1 and lower harmonics). By little to no response, it is meant that the harmonic response of the harmonics 603 is less than the harmonic response of at least one of the harmonics 604 in the biased group. In the example of FIG. 3B, the harmonic response of the harmonics 603 are all less than the harmonic response at the three harmonics lower than the main driving harmonic 601.

FIGS. 3A and 3B are illustrated for an example with thirty-one vanes. In an example with a different vane count, the main driving harmonic N may be shifted to align with the vane count and the N−1 harmonic and N+1 harmonic will likewise shift.

Accordingly, as shown in FIGS. 3A and 3B, the particular non-uniform vane spacing of the present disclosure described with respect to the circumferential row 200 of FIG. 2A and relationships (1) to (5) achieves biasing of the harmonics higher or lower than the main driving harmonic such that the opposing side of the main driving harmonic has little to no response.

Thus, the harmonic response of the circumferential row 200 of vanes having non-uniform vane spacing of the present disclosure biases the harmonic response with respect to the driving harmonic. This is contrary to other non-uniform vane spacings where the harmonic response is centered around the main driving harmonic (e.g., a bell-curve type arrangement) such that the harmonic response is uniformly distributed across the main driving harmonic N. That is, there is a harmonic response both higher and lower than the main driving harmonic. The harmonic response both higher and lower is greater than the little to no response illustrated in FIGS. 3A and 3B. Outside of the two percent to eleven percent range described herein, the harmonic response transitions to a harmonic response with a bell-curve distribution or a uniform distribution centered about the main driving harmonic, as previously described. That is, the biased harmonic response pattern diminishes outside of the two percent to eleven percent ranges described herein.

The targeting of the high side or the low side harmonics allows for a higher shift or a lower shift of the harmonic resonant speeds. Targeting the harmonic responses on only one side of the main driving harmonic may allow for engines to avoid higher or lower crossing speeds in the operating range and provide control over resonant response placement in the operating range. The non-uniform vane spacing of the present disclosure allows for control over the resonant response placement in the operating range of the engine.

The non-uniform vane spacing of the present disclosure provides the aforementioned benefit of reduction in amplitude as compared to uniform vane spacing. The targeting of the high side and the low side harmonics may show a reduction in overall effectiveness of the amplitude reduction as compared to non-uniform vane spacings with spacings outside of the two percent to eleven percent range. The biasing of the harmonics, however, allows for a cutoff or a severe reduction in the harmonics on one side of the main driving harmonic and this makes up for the lower reduction in overall amplitude of the harmonic response. That is, even though the amplitude of the harmonic response may be greater with the current design (as compared to other non-uniform vane spacings), the effectives of biasing the harmonics to one side of the main driving harmonic outweighs the otherwise higher amplitude in harmonic response. This is because the targeting of harmonics described herein allows for avoiding specific harmonics within the operating range of the engine.

Further aspects are provided by the subject matter of the following clauses.

A circumferential row of vanes with non-uniform vane spacing, the circumferential row of vanes includes a plurality of stator vanes arranged circumferentially about an inner ring, the plurality of stator vanes including a first group of stator vanes having a first spacing between adjacent stator vanes of the first group of stator vanes, and a second group of stator vanes having a second spacing between adjacent stator vanes of the second group of stator vanes, the second spacing being from two percent to eleven percent lesser than a nominal uniform vane spacing or two percent to eleven percent greater than the nominal uniform vane spacing, the nominal uniform vane spacing being defined by a total number of the plurality of stator vanes.

The circumferential row of vanes of the preceding clause, wherein the first spacing is uniform between the plurality of stator vanes in the first group of stator vanes and is based on the second spacing.

The circumferential row of vanes of any preceding clause, wherein the plurality of stator vanes includes only the first group of stator vanes and the second group of stator vanes.

The circumferential row of vanes of any preceding clause, wherein a number of stator vanes in the first group of stator vanes is equal to the total number of the plurality of stator vanes minus the number of stator vanes in the second group of stator vanes.

The circumferential row of vanes of any preceding clause, wherein a number of stator vanes in the second group of stator vanes is from twenty percent to forty percent of the total number of the plurality of stator vanes.

The circumferential row of vanes of any preceding clause, wherein the number of stator vanes in the second group of stator vanes is about one-third of the total number of the plurality of stator vanes.

The circumferential row of vanes of any preceding clause, wherein the second spacing is from two percent to eleven percent lesser than the nominal uniform vane spacing.

The circumferential row of vanes of any preceding clause, wherein the second spacing is from four percent to six percent lesser than the nominal uniform vane spacing.

The circumferential row of vanes of any preceding clause, wherein the second spacing is 4.3 percent lesser than the nominal uniform vane spacing.

The circumferential row of vanes of any preceding clause, wherein the second spacing is from two percent to eleven percent greater than the nominal uniform vane spacing.

The circumferential row of vanes of any preceding clause, wherein the second spacing is from four percent to six percent greater than the nominal uniform vane spacing.

The circumferential row of vanes of any preceding clause, wherein the second spacing is 5.2 percent greater than the nominal uniform vane spacing.

The circumferential row of vanes of any preceding clause, wherein the plurality of stator vanes provide a harmonic response defined by the total number of the plurality of stator vanes, the first spacing, and the second spacing.

The circumferential row of vanes of any preceding clause, wherein the second spacing is selected to bias the harmonic response to one or more harmonics above or below a uniform main driving harmonic defined by a uniformly spaced circumferential row of vanes.

The circumferential row of vanes of any preceding clause, wherein the harmonic response is biased to one or more harmonics above a uniform main driving harmonic defined by a uniformly spaced circumferential row of vanes.

The circumferential row of vanes of any preceding clause, wherein the harmonic response is biased above the uniform main driving harmonic due to the second spacing being from two percent to eleven percent lesser than the nominal uniform vane spacing.

The circumferential row of vanes of any preceding clause, wherein the harmonic response includes a main driving harmonic that occurs at the uniform main driving harmonic, a first harmonic one lower than the main driving harmonic, and the one or more harmonics, and wherein an amplitude of the harmonics below the first harmonic are less than an amplitude of at least one of the one or more harmonics.

The circumferential row of vanes of any preceding clause, wherein the harmonic response is biased to one or more harmonics below a uniform main driving harmonic defined by a uniformly spaced circumferential row of vanes.

The circumferential row of vanes of any preceding clause, wherein the harmonic response is biased below the uniform main driving harmonic due to the second spacing being from two percent to eleven percent greater than the nominal uniform vane spacing.

The circumferential row of vanes of any preceding clause, wherein the harmonic response includes a main driving harmonic that occurs at the uniform main driving harmonic, a first harmonic one higher than the main driving harmonic, and the one or more harmonics, and wherein an amplitude of the harmonics above the first harmonic are less than an amplitude of at least one of the one or more harmonics.

An engine includes a component having a plurality of rotor blades and a plurality of stator vanes, the plurality of stator vanes arranged in a circumferential row according to any preceding clause.

The engine of any preceding clause, the component being one or more of a high-pressure compressor, a low-pressure compressor, a high-pressure turbine, or a low-pressure turbine.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A circumferential row of vanes for a gas turbine engine, the circumferential row of vanes having non-uniform vane spacing and comprising:

a plurality of stator vanes arranged circumferentially about an inner ring, the plurality of stator vanes comprising:

a first group of stator vanes having a first spacing between adjacent stator vanes of the first group of stator vanes; and a second group of stator vanes having a second spacing between adjacent stator vanes of the second group of stator vanes, wherein the second spacing is from two percent to eleven percent lesser than a nominal uniform vane spacing or from two percent to eleven percent greater than the nominal uniform vane spacing, the nominal uniform vane spacing being defined by a total number of the plurality of stator vanes.

2. The circumferential row of vanes of claim 1, wherein the first spacing is uniform between the plurality of stator vanes in the first group of stator vanes and is based on the second spacing.

3. The circumferential row of vanes of claim 1, wherein the plurality of stator vanes comprises only the first group of stator vanes and the second group of stator vanes.

4. The circumferential row of vanes of claim 1, wherein a number of stator vanes in the first group of stator vanes is equal to the total number of the plurality of stator vanes minus the number of stator vanes in the second group of stator vanes.

5. The circumferential row of vanes of claim 1, wherein a number of stator vanes in the second group of stator vanes is from twenty percent to forty percent of the total number of the plurality of stator vanes.

6. The circumferential row of vanes of claim 5, wherein the number of stator vanes in the second group of stator vanes is about one-third of the total number of the plurality of stator vanes.

7. The circumferential row of vanes of claim 1, wherein the second spacing is from two percent to eleven percent lesser than the nominal uniform vane spacing.

8. The circumferential row of vanes of claim 7, wherein the second spacing is from four percent to six percent lesser than the nominal uniform vane spacing.

9. The circumferential row of vanes of claim 8, wherein the second spacing is 4.3 percent lesser than the nominal uniform vane spacing.

10. The circumferential row of vanes of claim 1, wherein the second spacing is from two percent to eleven percent greater than the nominal uniform vane spacing.

11. The circumferential row of vanes of claim 10, wherein the second spacing is from four percent to six percent greater than the nominal uniform vane spacing.

12. The circumferential row of vanes of claim 11, wherein the second spacing is 5.2 percent greater than the nominal uniform vane spacing.

13. The circumferential row of vanes of claim 1, wherein the plurality of stator vanes provide a harmonic response defined by the total number of the plurality of stator vanes, the first spacing, and the second spacing.

14. The circumferential row of vanes of claim 13, wherein the second spacing is selected to bias the harmonic response to one or more harmonics above or below a uniform main driving harmonic defined by a uniformly spaced circumferential row of vanes.

15. The circumferential row of vanes of claim 13, wherein the harmonic response is biased to one or more harmonics above a uniform main driving harmonic defined by a uniformly spaced circumferential row of vanes.

16. The circumferential row of vanes of claim 15, wherein the harmonic response is biased above the uniform main driving harmonic due to the second spacing being from two percent to eleven percent lesser than the nominal uniform vane spacing.

17. The circumferential row of vanes of claim 15, wherein the harmonic response includes a main driving harmonic that occurs at the uniform main driving harmonic, a first harmonic one lower than the main driving harmonic, and the one or more harmonics, and wherein an amplitude of the harmonics below the first harmonic are less than an amplitude of at least one of the one or more harmonics.

18. The circumferential row of vanes of claim 13, wherein the harmonic response is biased to one or more harmonics below a uniform main driving harmonic defined by a uniformly spaced circumferential row of vanes.

19. The circumferential row of vanes of claim 18, wherein the harmonic response is biased below the uniform main driving harmonic due to the second spacing being from two percent to eleven percent greater than the nominal uniform vane spacing.

20. The circumferential row of vanes of claim 18, wherein the harmonic response includes a main driving harmonic that occurs at the uniform main driving harmonic, a first harmonic one higher than the main driving harmonic, and the one or more harmonics, and wherein an amplitude of the harmonics above the first harmonic are less than an amplitude of at least one of the one or more harmonics.

* * * * *